April 1, 1930. R. H. PARK 1,752,807
PROTECTION OF ELECTRIC SYSTEMS
Filed Feb. 8, 1928
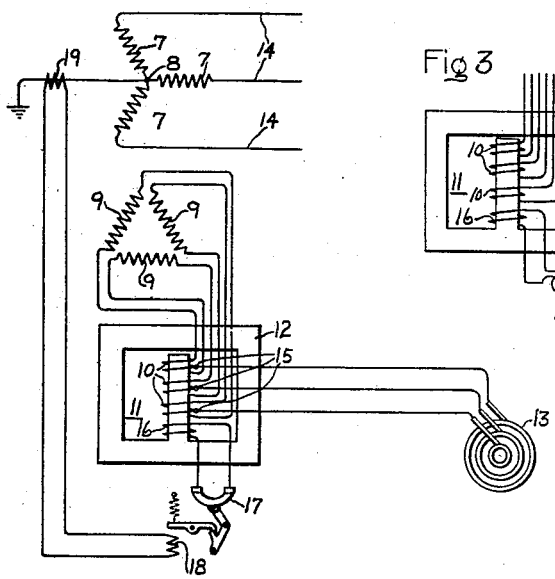
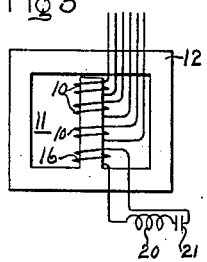
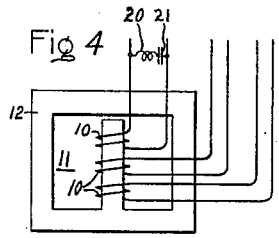
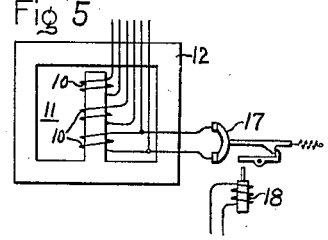
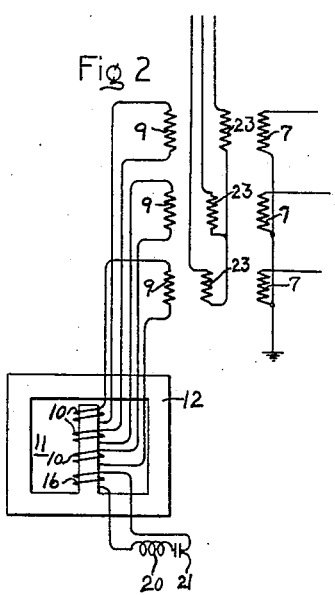
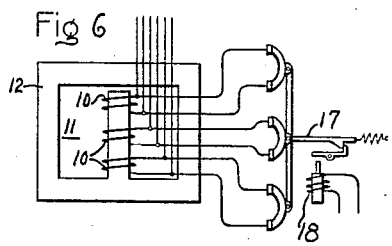
Inventor:
Robert H. Park
by Charles E. Tullar
His Attorney.

Patented Apr. 1, 1930

1,752,807

UNITED STATES PATENT OFFICE

ROBERT H. PARK, OF SCOTIA, NEW YORK, ASSIGNOR TO GENERAL ELECTRIC COMPANY, A CORPORATION OF NEW YORK

PROTECTION OF ELECTRIC SYSTEMS

Application filed February 8, 1928. Serial No. 252,914.

My invention relates to improvements in the protection of electric systems and more particularly to improved protective arrangements for limiting the current which tends to flow on the occurrence of abnormal conditions such as ground faults and an object of my invention is to provide an improved current limiting arrangement for electric systems having power transformers with a grounded neutral and windings connected in a closed circuit whose reactance is automatically available on the occurrence of ground faults.

More particularly my invention relates to improvements in current limiting arrangements for electric systems of the type disclosed in the copending application of George G. Cree, Serial No. 253,180 filed February 9, 1928, and assigned to the same assignee as this invention, wherein an impedance device is provided with a plurality of mutually inductively related windings connected alternately in series with a group of windings of a transformer in a closed circuit so as to provide a high impedance on the occurrence of ground faults on that side of the system including another group of windings of the transformer. Current limiting arrangements of this type are particularly desirable since with the growth of interconnection in the electric utility field enormous amounts of power are available to supply current on the occurrence of abnormal conditions such as ground faults. These conditions may subject the electric apparatus of the system to severe electric stresses and also because of the lack of stability result in an unnecessary falling out of step of synchronous apparatus by reason of the voltage drop accompanying the fault. Both are in general highly undesirable. Prior to this growth of interconnection, the individual systems, particularly those of high voltage, were often provided with transformers having the neutral grounded. With transformers used this way, the neutral is not ordinarily insulated to withstand any considerable voltage to ground. It is, therefore impractical and generally dangerous to insert any appreciable reactance directly in the neutral to ground connection of such transformers particularly where they have been or are to be used on high voltage systems such as, for example, 100 kv. or more, but the necessary impedance can be obtained, as pointed out in the aforesaid application, by an impedance device magnetically independent of the transformer and having mutually inductively related windings connected in series with a group of transformer windings in such a manner that each phase of the circuit on one side of the transformer has one of each of the inductive windings and the transformer windings connected across it and in series with each other.

In accordance with my invention, I provide an arrangement whereby the impedance of the inserted windings is substantially reduced or eliminated for one of the harmonics such for example as the third without affecting the value of the impedance which is necessary on the occurrence of ground faults, so as to avoid, when necessary or desirable, interference with communication circuits and also to insure good magnetizing action.

My invention will be better understood from the following description when considered in conection with the accompanying drawing and its scope will be pointed out in the appended claims.

In the accompanying drawing Fig. 1 illustrates diagrammatically an electric system embodying my invention; Fig. 2 represents diagrammatically another electric system embodying my invention and Figs. 3, 4, 5 and 6 represent modifications of impedance devices embodying my invention.

In Fig. 1, I have illustrated part of a polyphase electric system comprising a power transformer having a plurality of windings 7 connected to a grounded common or neutral point 8, a plurality of windings 9 connected in series in a closed circuit including the mutually inductively related windings 10 of an impedance device 11. This impedance device is herein shown as comprising a three branched iron core 12 on the middle branch of which the windings 10 are mounted. As shown the delta connected low voltage windings 9 of the transformer are connected to a circuit, comprising a polyphase dynamoelectric machine such as the generator 13 in such a manner that each phase of the circuit has connected thereacross one of each of the windings 9 and 10. The generator 13 supplies the power transformer whose high voltage windings 7 are connected to the line phase conductors 14.

In order normally to maintain the reactance of the impedance device substantially zero for alternating currents other than those due to leakage, the alternating current windings of the generator 13 are connected to corresponding points in the closed circuit comprising the transformer windings 9 and the impedance device windings 11 such as the midpoints 15 of the windings 10. The windings 10 are wound on the middle branch of the core 12 in such a manner that for any current which tends to circulate in the closed circuit comprising the transformer windings 9 and the reactance windings 10, the magnetic fluxes set up by these windings are additive. Since, however, the vector sum of the fundamental three-phase currents flowing in the transformer windings 9 is normally substantially zero, the resultant of the fluxes established by reason of these fundamental currents of the windings 10 is normally substantially zero.

With the star-delta connected transformer, such as shown in Fig. 1, however, third and other harmonics tend to flow in the closed circuit connection comprising the windings 9 and 10. Certain of these harmonics, such as the third are essential to insure the production of electromotive forces of a desired wave form in the transformer phase windings and occur as a result of the harmonics obtaining in the exciting currents of the transformer windings. Considering for example the triple harmonic, it will be obvious that this tends to circulate in the closed circuit comprising the transformer windings 9 and the impedance windings 10 connected at the corners of the delta. Since the triple harmonics in the three phases of the system are in phase with each other such a circulation of the triple harmonics would be hindered if the impedance of the impedance device 11 were relatively large.

In accordance with my invention I provide flux controlling means associated with the impedance device 11 for reducing or decreasing the impedance thereof to currents which tend to circulate in the closed circuit. As shown in Fig. 1 this means comprises another winding 16 inductively associated with the reactance windings 10 and arranged to effect a substantially unimpeded flow to a harmonic of the power current circulating in the transformer windings 9.

In the arrangement shown in Fig. 1, the winding 16 is arranged normally to be short-circuited by any suitable means such as a circuit breaker 17 which is arranged to be responsive to a ground fault on the system on the star connected side of the power transformer so as to open-circuit the winding 16 whereby the full impedance of the device 11 will be established for both the fundamental and the harmonics of the power current. For the sake of simplicity, I have shown the circuit breaker 17 schematically and as of the latched closed type having a trip coil 18 connected to be energized in accordance with the ground fault current, as through a current transformer 19 in the ground connection of the transformer neutral 8. Obviously the quicker the impedance of the device 11 is established on the occurrence of a ground fault, the better for the stability of the electric system and, therefore, the circuit breaker used to control the winding 16 is preferably quick acting and may be of the so-called high speed types such as disclosed for example in U. S. Letters Patent 1,287,545 to W. W. Willard, issued December 10, 1918, or British Patents 253,923 and 266,359, each of which disclose circuit breakers operative in response to a predetermined current. Obviously, if the winding 16 is wound with a small number of turns, a low voltage circuit breaker can be used. This is advantageous from the point of economy and the ability to obtain high speed of operation.

Instead of having the flux controlling means comprise another or auxiliary winding 16 arranged to be short-circuited by a circuit breaker 17, one of the windings 10 itself may be controlled by the circuit breaker in the manner that the winding 16 of Fig. 1 is controlled. Such an arrangement is illustrated in Fig. 5, the lower one of the three windings 10 being normally short-circuited by the circuit breaker 17. In order to eliminate any possibility of normal unbalance of the windings 10 so that they would present an impedance to the fundamental of the power currents in the three transformer windings 9, all of the windings 10 may be normally short-circuited by a triple pole circuit breaker 17′ as shown in Fig. 6. This arrangement in effect closes the corners of the delta windings 9, thereby normally providing a relatively low impedance path for the third harmonics.

Instead of having the winding 16 of Fig. 1 short-circuited for all frequencies and then open-circuited on the occurrence of fault conditions, it may be permanently short-circuited by any suitable means which will not cause the impedance device 11 to present a high reactance to the harmonic current which it is desired to permit to circulate. As shown in Fig. 3 for example, this may be accomplished by short-circuiting the winding 16 through a series resonant circuit comprising an inductance 20 and a capacitance 21 properly tuned for the harmonic which it is desired to pass.

Instead of having another or auxiliary inductive winding 16 for controlling the impedance of the impedance device 11 for harmonic currents one of the windings 10 may be short-circuited by a series resonant circuit comprising an inductance 20 and a reactance 21 as shown in Fig. 4. As before this series resonant circuit is to be tuned for the harmonic current for which minimum impedance is desired.

In Fig. 2, I have illustrated an embodiment of my invention such as the impedance arrangement of Fig. 3 applied to a power system comprising a transformer having the star connected windings 7, star connected windings 23 and the auxiliary windings 9 which are connected alternately in series with the reactance windings 10 in a closed circuit. In Fig. 2, I have illustrated the impedance device 11 with a flux controlling means for reducing the harmonic impedance such as shown in Fig. 3 wherein the auxiliary reactance winding 16 is arranged to be short-circuited by a series resonant circuit tuned to the frequency of the harmonic for which minimum impedance is desired.

While I have shown and described my invention in considerable detail I do not desire to be limited to the exact arrangements shown but seek to cover in the appended claims all its modifications that fall within the true spirit and scope of my invention.

What I claim as new and desire to secure by Letters Patent of the United States is:

1. In combination with a power transformer having a plurality of windings one terminal of each of which is connected to a common point and a plurality of cooperating polygonally connected windings, an impedance device having a plurality of mutually inductively related windings connected alternately in series in a closed circuit with said cooperating transformer windings, said impedance device windings being arranged to provide additive magnetic fluxes for currents circulating in the closed circuit, and means for reducing the impedance of said impedance device to a harmonic of the power current flowing in said transformer.

2. In combination with a polyphase circuit and a power transformer comprising a group of polyphase windings, means for limiting the flow of leakage current in said transformer comprising a plurality of mutually inductively related windings, said inductive windings and said group of transformer windings being connected in series with one of each of said inductive and said transformer windings connected across the respective phases of said circuit, and flux controlling means associated with said inductive windings for normally decreasing the inductive reactance thereof to a harmonic of the power current flowing in said transformer.

3. In combination with a polyphase circuit and a power transformer comprising a group of polyphase windings, means for limiting the flow of leakage current in said transformer comprising a plurality of mutually inductively related windings magnetically independent of the transformer connected in series in a closed circuit and arranged to provide additive magnetic fluxes for current circulating in said closed circuit, said inductive windings and said transformer windings being connected with one of each of said inductive and said transformer windings connected across the respective phases of said polyphase circuit, and flux controlling means comprising another winding inductively associated with said inductive windings and arranged normally to decrease the inductive reactance thereof to a harmonic of the power current flowing in said transformer.

4. In combination with a three-phase power transformer having three windings connected in star with the neutral grounded and three windings connected in delta, an inductive reactance device having a plurality of mutually inductively related windings connected in series in a closed circuit with said delta connected windings at the corners of the delta, said reactance windings being arranged to provide additive magnetic fluxes for currents circulating in the closed circuit and means for reducing the reactance of said reactance device to a harmonic of the power current flowing in said transformer comprising another winding inductively associated with said reactance device windings, and switching means operative on the occurrence of a ground fault on the star connected side of the transformer to control the circuit of said other winding.

5. In a three-phase electric system, a power transformer having three high voltage windings connected in star with the neutral grounded and three low voltage windings connected in delta, a source of three-phase current connected to said low voltage windings, means for limiting the fault current in the high voltage side of the system on the occurrence of a ground fault thereon comprising a reactance device having three mutually inductively related windings connected in series with the delta connected windings of the transformer at the corners of the delta, and means comprising another winding inductively associated with said reactance device windings for reducing the reactance of the reactance device to a harmonic of the power current circulating in said delta connected windings.

6. In a three-phase electric system, a power transformer having three high voltage windings connected in star with the neutral grounded and three low voltage windings connected in delta, a source of three-phase current connected to said low voltage windings, means for limiting the fault current in the high voltage side of the system on the occurrence of a ground fault thereon comprising a reactance device having three mutually inductively related windings connected in series with the delta connected windings of the transformer at the corners of the delta, and means for reducing the reactance of said reactance device to a third harmonic current circulating in said delta connected windings comprising another winding inductively associated with said reactance device windings, and means for short-circuiting said winding to reduce the reactance of said device to the third harmonic.

7. In combination with a power transformer having a plurality of windings connected to a common point and a plurality of windings respectively associated with said first windings and connected in a closed circuit, an impedance device comprising a plurality of mutually inductively related windings magnetically independent of the transformer and connected alternatively in series with the windings in the closed circuit, said impedance device windings being arranged to provide additive magnetic fluxes for currents circulating in the closed circuit, and means comprising another winding inductively associated with said impedance device windings for reducing the impedance of said device to a harmonic of the power current flowing in said transformer.

8. In combination with a power transformer having a plurality of windings one terminal of each of which is connected to a common point and a plurality of cooperating polygonally connected windings, an impedance device having a plurality of mutually inductively related windings connected alternately in series in a closed circuit with said cooperating transformer windings, said impedance device windings being arranged to provide additive magnetic fluxes for currents circulating in the closed circuit, another winding inductively associated with said impedance device windings and arranged normally to be short-circuited whereby to reduce the impedance of said impedance device, and means responsive to a ground fault on the side of the power transformer having its windings connected to a common point for effecting the open-circuiting of said other winding.

9. In combination with a power transformer having a plurality of windings one terminal of each of which is connected to a common point and a plurality of cooperating polygonally connected windings, an impedance device having a plurality of mutually inductively related windings connected alternately in series in a closed circuit with said cooperating transformer windings said impedance device windings being arranged to provide additive magnetic fluxes for currents circulating in the closed circuit, and flux controlling means associated with said impedance device for normally decreasing the inductive reactance thereof to a harmonic of the power current flowing in said transformer.

10. In combination with a power transformer having a plurality of windings one terminal of each of which is connected to a common point and a plurality of cooperating polygonally connected windings, an impedance device having a plurality of mutually inductively related windings connected alternately in series in a closed circuit with said cooperating transformer windings said impedance device windings being arranged to provide additive magnetic fluxes for currents circulating in the closed circuit, and flux controlling means comprising another winding inductively related to said impedance device windings and arranged normally to decrease the inductive reactance of the impedance device to a harmonic of the power current flowing into said transformer.

In witness whereof, I have hereunto set my hand this 7th day of February, 1928.

ROBERT H. PARK.